United States Patent [15] 3,650,867
Bauer [45] Mar. 21, 1972

[54] METHOD OF PRODUCING LAMINATED TEXTILE FABRICS WITH IMPROVED DIMENSIONAL STABILITY

[72] Inventor: Jackson Bauer, Croydon, Pa.
[73] Assignee: Collins and Aikman Corporation, New York, N.Y.
[22] Filed: June 25, 1969
[21] Appl. No.: 836,479

[52] U.S. Cl. ............................156/183, 156/324, 156/331, 156/82
[51] Int. Cl. ...........................................B31f 1/12
[58] Field of Search...............156/324, 82, 331, 160, 83, 156/161, 85, 163, 229, 164, 183, 196, 178, 179; 161/159, 89

[56] References Cited

UNITED STATES PATENTS 2,878,153   3/1959   Hacklander.....................156/163 X
3,028,279   4/1962   Heberlein......................156/160 X Primary Examiner—Carl D. Quarforth
Assistant Examiner—Stephen J. Lechert, Jr.
Attorney—Paul & Paul

[57] ABSTRACT

A method is provided for producing laminated textile fabrics with improved dimensional stability. In the present method, a laminate comprised of at least one ply of a textile fabric and at least one ply of a foam which plies are laminated together with an uncured to partially cured adhesive is compacted and then cured. The laminated textile fabrics of this invention are especially useful in the manufacture of wearing apparel, but also find uses in home furnishings and in industrial applications.

8 Claims, 3 Drawing Figures

PATENTED MAR 21 1972

3,650,867

INVENTOR
JACKSON BAUER
BY Paul & Paul
ATTORNEYS.

METHOD OF PRODUCING LAMINATED TEXTILE FABRICS WITH IMPROVED DIMENSIONAL STABILITY

BACKGROUND OF THE INVENTION

1. Field of the Invention

This invention relates to the method of producing laminated textile fabrics. More particularly, this invention is concerned with the method of producing laminated textile fabrics having improved dimensional stability which are comprised of at least one ply of a textile fabric and at least one ply of a foam.

2. Description of the Prior Art

Laminated textile fabrics are layered fabric structures which have a face or outer fabric which is laminated to a continuous sheet material such as a polyurethane foam in such a way that the identity of the continuous sheet material is retained.

Laminated textile fabrics are manufactured by laminating one or more plies of a textile fabric to a foam such as a polyurethane foam. The textile fabrics that are employed may be either knitted or woven with a knitted fabric being more commonly employed as the backing fabric. The textile fabrics that are generally employed are of a rather open and loose construction.

The fabrics are bonded to the foam by various methods. One method is to use a curable bonding agent such as an acrylic or urethane adhesive. In addition, the bonding can be accomplished by flame laminating methods wherein a thermoplastic foam such as a polyesterurethane foam is initially advanced over a flame which melts the surface of the foam. A textile fabric ply is then brought into contact with the molten surfaces of the foam which acts as the adhesive.

Laminated textile fabrics have many properties which make them especially useful for certain applications. The lightweight, full body and excellent insulating properties of the laminated textile fabrics make them especially useful in apparel applications such as outer wear.

Laminated textile fabrics would be more extensively employed except for the fact that the laminated textile fabrics heretofore available had notoriously poor dimensional stability especially to home laundering and dry cleaning. It was not uncommon for the prior art, laminated textile fabrics, to shrink 5 to 15 percent after being laundered. In addition, the overall shrinkage of the laminated fabrics, the various plies comprising the laminated textile fabric tended to shrink at different rates which further caused the laminated fabric to buckle or pucker which was highly undesirable.

Various methods have been suggested by the prior art to improve the laundering and dry cleaning dimensional stability of conventional single layer textile fabrics. One method which has proven to be especially useful is compacting. The method of compacting are well known to those skilled in the art and are disclosed in patents such as Walton U.S. Pat. No. 2,765,513.

The methods of compacting conventional textile fabrics have not, however, proven to be successful in the manufacture of laminated textile fabrics. Attempts to compact the individual plies of the laminate before bonding did not sufficiently increase the dimensional stability of the final product. The foam plies could not be satisfactorily compacted before lamination because of their inherent elasticity. The textile fabrics likewise were difficult to maintain in the compacted state before lamination because the textile fabrics that are generally employed to make laminated textile fabrics are of an extremely loose open construction which does not readily hold compaction. A further problem encountered was that each type of fabric and foam had a different laundering and dry cleaning shrinkage and accordingly each had to be compacted a different amount. However, the compacted fabrics and foams when bonded together did not shrink the same amount as when unbonded and accordingly, some buckling and puckering still occurred. An additional problem encountered was that the process steps involved in laminating pulled out a considerable amount of compacting before bonding occurred. A further objection to compacting the plies before laminating was that it was not economically feasible because of the additional process cost involved in compacting each ply before lamination.

Attempts to compact the laminated textile fabrics after laminating were also unsuccessful in that the fabrics would not retain a sufficient amount of compaction to control the dimensional stability and in certain instances compacting caused a considerable amount of delamination.

It is accordingly, a primary object of this invention to provide laminated textile fabrics having improved dimensional stability.

It is a further object of this invention to provide a process for the manufacture of laminated textile fabrics which have improved dimensional stability.

Other objects and advantages of this invention will become further apparent from a review of the drawings and subjoined specifications and claims.

SUMMARY OF THE INVENTION

In accordance with the present invention, laminated textile fabrics having improved dimensional stability are obtained by compacting a laminate comprised of at least one ply of a textile fabric and at least one ply of a foam in which the plies are laminated together by uncured to partially cured adhesive and then fully curing the laminate.

DESCRIPTION OF THE PREFERRED EMBODIMENTS

Figures 1, 2, 3:
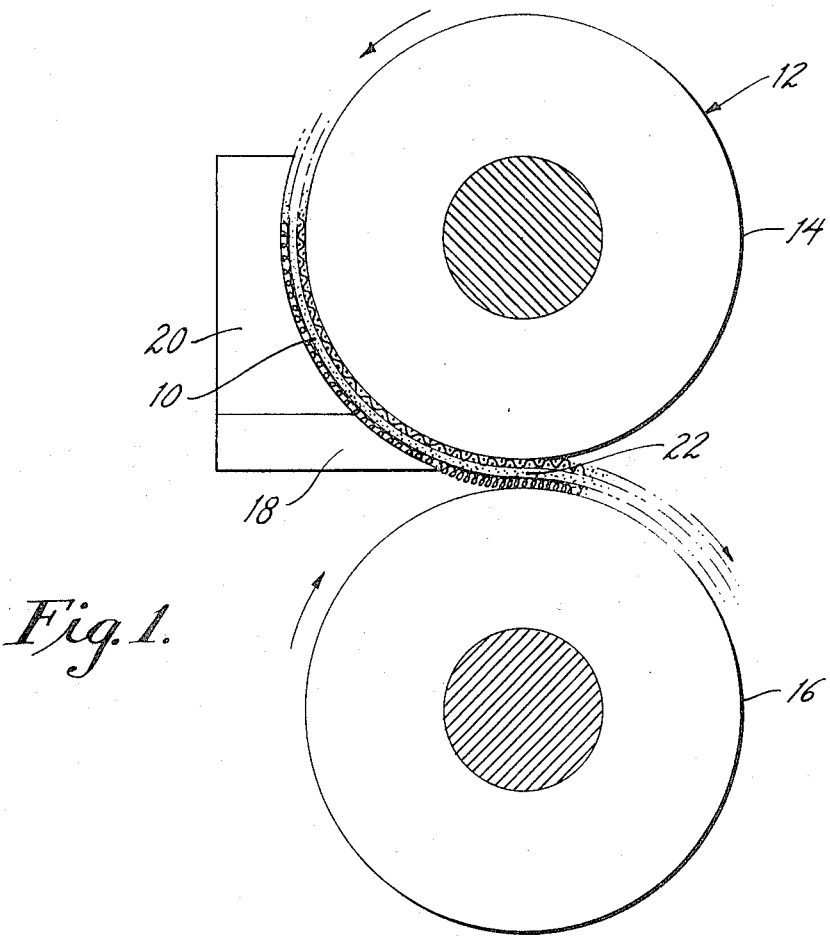
FIG. 1 is a schematic illustration of a compactor through which a laminate comprised of a woven fabric, a foam and a knitted fabric is shown being processed.
FIG. 2 is an enlarged cross sectional illustration of an uncompacted laminate.
FIG. 3 is an enlarged cross sectional illustration of the compacted laminate.

The initial step in the process of the present invention is the preparation of the starting laminate. The starting laminate is comprised of at least one ply of a textile fabric and at least one ply of a foam and the plies are laminated together by uncured to partially cured adhesive.

The textile fabrics that are used to make the laminates are substantially identical to the fabrics employed by the prior art to make laminated textile fabrics, with the exception that somewhat lighter weight goods can be employed since the compacting will increase the weight per lineal yard of the goods. The fabrics may be knitted or woven and may be comprised of natural fibers such as cotton or wool, regenerated fibers such as viscose rayon, synthetic fibers such as acetate rayon, polyamides, polyesters, polyolefins or blends of these fibers.

The foams that are employed are likewise substantially identical to the foams previously employed by prior art for laminated textile fabrics with the exception that somewhat lighter weight foams can also be employed since compacting will also increase the weight per lineal yard of the foam. Either the polyesterurethane or the polyetherurethane foams are especially useful in the process of the present invention when an adhesive is employed as the laminating agent.

The laminate may be comprised of only two plies, a textile fabric ply and a foam ply. However, in general, it is preferable to employ a face ply of a textile fabric, a core ply of foam and a backing ply of a textile fabric, preferably a knitted tricot fabric.

The adhesive that is employed to make the laminate is a critical component of the laminate. The adhesive that is selected should hold the plies of the laminate together during the initial processing steps and during compacting. The adhesive must, however, have sufficient flowability that areas of bonding placed under excessive stress by compacting will be mobile and the adhesive should then be in a position to cure and hold the plies together in the new configuration imparted by the compacting step. The adhesive should also be curable to a form wherein it will not be substantially affected by either dry cleaning or laundering. The ideal adhesive should have "green" tack, that is it should have a sufficient adhesiveness in the uncured state that it will hold the plies together. However, it is possible to use adhesives which have to be partially cured in order to provide sufficient adhesion to hold the plies together. Liquid adhesives are most useful in the manufacture of the starting laminate. Adhesives may be of the water dispersible types such as the aqueous dispersions of the acrylic polymers or may be of the solvent dispersed types such as the solvent solutions of the urethane adhesives. The adhesives are applied in the conventional manner, for example the foam ply can be heated with a solution of the adhesive and then the adhesive dried to a point where it acquires a sufficient "green" tack. The textile fabric is then brought into contact with the adhesive treated foam to form the laminate. Care is taken in the laminating step to limit as much as possible the advance of the cure of the adhesive.

It is also possible to use the flame laminating technique to make the laminated textile fabric of this invention when a polyesterurethane foam is employed as the core ply. In the flame laminating technique, the surface resin of the polyurethane foam is melted. The thermodegradation of the polyurethane foam causes free isocyanate groups to form which attach themselves both physically or chemically to the fibers. On exposure to hydroxyl groups as for example the water vapor in the air the urethane linkages reform. The reestablishment of the urethane linkages after lamination takes place over a somewhat extended period. The thermally degraded urethane resin during this period is in effect a partially cured adhesive and as such is included within the scope of this invention. If the flame laminating technique is employed, the laminate should be compacted as soon as possible after lamination.

The starting laminate 10 prepared as indicated above is fed into a compactor 12. The compactor 12 which is schematically illustrated in FIG. 1 is comprised of a feed roll 14 and a retarding roll 16, a fabric indenter 18 and a steam heated shoe 20. The feed roll 14 is driven so as to have predetermined peripheral speed. The retarding roll 16 is driven so as to have a peripheral speed which is less than the speed of the feed roll 12. In addition, the surfaces of the retarding roll is somewhat roughened as by mild etching or metallic spray coating so that it will grip the laminate 10 with greater frictional force than the feed roll 14, at the nip 22 of the feed roll 14 and the retarding roll 16. The speed of advancement of the laminate 10 is decelerated from the peripheral speed of the feed roll 12 to the peripheral speed of the retarding roll 14 because of the greater gripping effect of the retarding roll 14 on the laminate 10. The fabric indenter 18 is an elongated bar which extends across the width of the compactor parallel to the nip 22 of the feed roll 14 and retarding roll 16. The fabric indenter 22 prevents a substantial portion of the compacting forces imparted to the laminate 10 by the difference in speeds of the feed roll 14 and the retarding roll 16 from being fed into the section of the laminate which is rearward of the forward edge of the fabric indenter 18. The fabric indenter 18 is spaced from the nip 22 a predetermined distance. The area between the fabric and the nip 22 is a deceleration zone wherein the compacting of the laminate 10 occurs. The steam heated shoe 20 is used to preheat the laminates before compacting.

In the compacting process, the laminate which is in frictionally restrained engagement with the retarding roll 16 is prevented from advancing at the same rate as the rate of speed of the feed roll 14. This causes the laminate 10 to expand in directions normal to the direction of advancement, thereby causing the laminate 10 to become compacted. The speed of the feed roll 14, the retarding roll 16 and the length of deceleration zone are selected so as to compact the laminate a predetermined amount without causing detrimental buckling of the laminate 10 in the compacting process. It is of course possible to select the speeds of the feed roll 14 and the retarding roll 16 and the length of the deceleration zone so as to cause a certain amount of controlled pleating to obtain a decorative effect in the final laminated textile fabric. The present process is not limited to anyone particular type of compactor, however, it has been found that the compactors of the type disclosed by R. R. Walton in U.S. Pat. No. 2,765,514 are particularly useful in the process of this invention. Since the actual mechanics of the operation of a compactor are to some extent dependent on the particular type of compactor employed and are well within the knowledge of those skilled in the art, additional details on the actual operation of the compactor are not necessary.

It should be carefully noted that the effect of compacting on the laminate 10 is quite different from the effect of compacting on a conventional textile fabric. This can be seen by reference to FIG. 2 and 3. The starting uncompacted laminate 10 illustrated in FIG. 2 has a face ply 24 of a woven textile fabric, a foam core ply 26 and a backing ply of a knitted fabric 28. The plies 24, 26 and 28 of the uncompacted laminate 10 are joined by an uncured to partially cured resin 30. As the laminate 10 is advanced through the deceleration zone between the fabric indenter 18 and the nip 22, the laminate 10 is compacted which causes the plies of the laminate 10 to expand in directions normal to the direction of advancement indicated by the arrow on FIG. 3. The expansion in directions normal to the direction of advancement is obtained because the plies comprising of the laminate are forced by the compacting force into a curved fan-fold configuration as is illustrated in FIG. 3. It can be appreciated from the illustration in FIG. 3 that the outwardly curved surfaces of each ply are stretched somewhat by the compacting step, while the inwardly curved sections of each ply are somewhat compressed by the compacting step. This change in the surface area of the plies causes strains to be placed upon the initially adhered areas of the uncured laminate. If the strain on the uncured adhesive is excessive, the adhesive will flow and because an uncured to partially cured adhesive is employed, the adhesive will reform in a configuration in which it will tend to hold the laminate in the compacted form. When the adhesive is fully cured, the adhesive will then hold the laminated textile in the compacted form.

The problem of both compacting the individual plies and realigning of the bonds between the plies is not encountered when compacting a conventional single ply textile fabric. However, when it was attempted to compact the fully cured laminated textile fabrics of the prior art, the bonds which were fully cured before compacting caused the fabric to resist compacting unless they were broken and if the bonds were broken, delamination or loss of bond strength occurred. Furthermore, even after fabrics were compacted, the presence of the cured bonds which were placed under stress by compacting tended to cause the fabrics to return to the uncompacted form. This should be compared to the process of the present invention wherein when the adhesive is placed under stress by compacting, the adhesive flows so as to hold the laminated textile in the compacted form.

The amount of compacting to which the laminate 10 is subjected depends to a large extent on the desired dimensional stability required in the final laminated textile fabric. Even a relatively small amount of compacting of the uncured laminate will increase the dimensional stability of the laminated textile fabric to some extent. It is preferable, however, to compact the laminate in an amount at least sufficient to compensate for a substantial portion of the inherent laundering and dry cleaning dimensional instability of the laminated textile fabric. In this regard, it should be noted that laminated textile fabrics exhibit a shrinking which is not necessarily a composite of the shrinkages of the various plies comprising the laminate textile fabric. Accordingly, in order to evaluate the amount of compacting which should be imparted to a given laminated textile fabric, the fabric should be completely cured in the uncompacted form and then subjected to the various tests for which dimensional stability is required such as dry cleaning and laundering. The uncured laminate should be compacted in an amount at least sufficient to compensate for the inherent dimensional instability of the uncompacted laminate plus an additional amount to compensate for the unavoidable loss of compacting caused by handling during processing. In this regard, it should be noted, however, that in general a shrinkage of up to 3 percent in either length or width direction is not considered to be objectionable. It should be further noted that it is possible to compact a laminated textile fabric in an amount considerably greater than the amount required to compensate for the inherent shrinkage of the laminated textile and thereby obtain a laminated textile fabric with stretch properties. It is further possible to compact the laminate so as to form decorative pleating or folds in the final laminated textile fabric.

After the laminate has been compacted, it is cured to fully set the laminate in the compacted form. The method of curing employed is dependent on the particular type of adhesive used. With an adhesive such as the urethanes, it is possible, for example simply to roll up the fabric directly off the compactor and keep it in the rolled form for several days at room temperatures whereupon the adhesive will cure itself. It is also possible to use heat cured adhesives, such as the acrylics, wherein the fabric is subjected to a heat treatment after the compacting so as to set the fabric in the compacted form.

The method described above for obtaining dimensionally stabilized laminated textile fabrics can be modified without departing from the scope of the present invention, for example other types of compactors can be employed than the type schematically illustrated in FIG. 1. In addition, the compacting step can be combined with other processes. For example, a variation of the above described method which has been proven to be especially valuable is to use a heat settable material such as a polyamide knitted or woven fabric as the facing ply, backing ply or for both surfaces. The uncured laminate thus obtained is compacted as described above in an amount considerably greater than the amount required to compensate for the inherent shrinkage of the laminated textile fabric. The compacted laminate is then subjected to a heat treatment sufficient to both set the heat settable fabric and cure the adhesive whereby a stretchable, dimensionally stabilized textile laminate is obtained.

I claim:

1. The method for producing a laminated textile fabric with improved dimensional stability comprising; bonding at least one ply of an uncompacted textile fabric and at least one ply of a foam together with an uncured to partially cured adhesive having sufficient adhesive strength in the uncured to partially cured state to bond said textile ply and said foam together to form a laminate, said adhesive in said uncured to partially cured state being flowable in response to the application of a compacting force, compacting said laminate using at least said compacting force an amount sufficient to at least compensate for a substantial portion of the dimensional instability of said laminated textile fabric and thereafter curing said adhesive.

2. The process according to claim 1 wherein said compacting comprises positively advancing said laminate at a first speed toward a surface traveling at a second slower speed and ultimately carrying said laminate into frictionally restrained engagement with said surface, said laminate passing through a deceleration zone of a predetermined length immediately prior to engagement with said surface, said first and second speeds and predetermined length of said deceleration zone being related so as to cause said laminate to expand in directions normal to and thereby be compacting in the direction of advancement.

3. The process according to claim 2 wherein said laminate is comprised of a facing ply, a core ply and backing ply and wherein said facing and backing plies are textile fabrics and said core ply is a foam.

4. The process according to claim 3 wherein at least one of said textile fabrics is a knitted fabric.

5. The process according to claim 3 wherein at least one of said textile fabrics is a woven fabric.

6. The process according to claim 3 wherein at least one of said textile fabrics is comprised of a thermally settable fiberous material selected from the group consisting of polyamide and polyester and said laminate is compacted in an amount in excess of the amount required to compensate for the dimensional instability of the laminated textile fabric and thereafter said laminate is heated to a temperature sufficient to heat set said fiberous material, whereby a stretch laminated textile fabric is obtained.

7. The process according to claim 3 where said core ply is a polyurethane foam.

8. The process according to claim 6 wherein said adhesive is polymerizable acrylic or urethane resin.

* * * * *